(12) United States Patent
Watanabe

(10) Patent No.: US 6,371,888 B1
(45) Date of Patent: Apr. 16, 2002

(54) CONTROL APPARATUS FOR VEHICULAR AUTOMATIC TRANSMISSION

(75) Inventor: Shinji Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 3 days.

(21) Appl. No.: 09/625,322

(22) Filed: Jul. 25, 2000

(30) Foreign Application Priority Data

Jan. 11, 2000 (JP) ........................................ 2000-002491

(51) Int. Cl.[7] ............................................. B60K 41/02
(52) U.S. Cl. ........................ 477/174; 477/181; 477/906
(58) Field of Search ................................ 477/166, 174, 477/180, 181, 905, 906, 83

(56) References Cited

U.S. PATENT DOCUMENTS

| | | | | |
|---|---|---|---|---|
| 4,393,732 A | * | 7/1983 | Suzuki et al. | 477/906 X |
| 5,235,951 A | * | 8/1993 | Taguchi et al. | 123/397 |
| 5,366,424 A | * | 11/1994 | Wataya | 477/107 |
| 5,411,452 A | * | 5/1995 | Katayama | 477/206 |
| 5,588,935 A | * | 12/1996 | Osinski et al. | 477/107 |
| 5,976,056 A | * | 11/1999 | Matsumono et al. | 477/906 X |

FOREIGN PATENT DOCUMENTS

| | | | | |
|---|---|---|---|---|
| JP | 63-47546 | * | 2/1988 | 164/155.1 |
| JP | 63-270252 | | 11/1988 | |
| JP | 4-231631 | * | 8/1992 | |

* cited by examiner

*Primary Examiner*—Charles A Marmor
*Assistant Examiner*—Ha Ho
(74) *Attorney, Agent, or Firm*—Sughrue Mion, PLLC

(57) ABSTRACT

A gear changing operation of a synchronous mesh type automatic transmission is automated through positional control on a shift select actuator unit. To this end, a throttle opening control condition at a fully released position of an accelerator pedal is monitored. A throttle actuator opens and closes the throttle valve in an air intake pipe of an engine. A throttle opening sensor senses an opening degree of the throttle valve. A control unit determines an abnormal throttle opening condition when the opening degree of the throttle valve sensed by the throttle opening sensor is not less than a predetermined value under the condition that the shift lever position is in a drive range and that the accelerator sensor senses a fully-released position of the accelerator pedal, so that it controls the power transmitting clutch or the transmission into a power interrupting state or a neutral state for safety driving.

4 Claims, 8 Drawing Sheets

CONTROL APPARATUS FOR VEHICULAR AUTOMATIC TRANSMISSION

BACKGROUND OF THE INVENTION

1. Field of the Invention

The present invention generally relates to a control apparatus for a vehicular automatic transmission equipped with an electronic throttle apparatus. More specifically, the present invention is directed to a technique capable of controlling an automatic transmission when an abnormal throttle operation occurs.

2. Description of the Related Art

A technique capable of controlling a synchronous mesh type automatic transmission is known from, for example, Japanese Patent Application Laid-Open No. sho 63-270252, which was laid open to the public in 1988. In this control technique, when a gear of an automatic transmission is changed, a throttle valve is controlled to be set to a valve closing side by actuating an electronic throttle apparatus, and engine power transmitted from an engine to the transmission is interrupted by energizing an electromagnetic clutch, and then, a gear-change stage (transmission gear stage) is changed by operating a transmission actuator.

In a vehicle equipped with the above-described electronic throttle apparatus, generally, a throttle control apparatus monitors a variety of sensors, actuators and microprocessors, and when the throttle control apparatus detects that such an abnormal condition happens to occur, it limits engine power. However, there is the case where a malfunction mode occurs which cannot be detected as an abnormal condition while the monitoring operation of the throttle control apparatus is performed. For this malfunction mode, for example, data of a target throttle opening degree saved in a RAM becomes error. In such a case, the throttle control apparatus can never limit the engine power although the abnormal throttle operation is carried out. As a result, this may cause a problem on safety drive.

SUMMARY OF THE INVENTION

The present invention is intended to obviate the above-explained problem encountered with the conventional control apparatus for the vehicular automatic transmission equipped with the electronic throttle apparatus, and accordingly, has an object to provide a control apparatus for a vehicular automatic transmission, which can firmly limit engine power when an abnormal throttle operation happens to occur, to thereby ensure a safety driving operation.

Another object of the present invention is to provide a control apparatus for a vehicular automatic transmission, by which an abnormal condition of a throttle actuator can be monitored based on the throttle opening control condition at a fully released position of an acceleration pedal so that when it is determined that an abnormal throttle opening degree takes place, the vehicle driving system is brought into a neutral condition, thereby avoiding the unintentional running of the vehicle.

To achieve the above-described objects of the present invention, according to one aspect of the present invention, there is provided a control apparatus for a vehicular automatic transmission comprising: a throttle actuator for opening/closing a throttle valve provided in an air intake pipe of an engine; a throttle opening sensor for sensing an opening degree of the throttle valve; a transmission having a shift lever and a plurality of gear-change stages for speed-changing a revolution force of the engine so as to transmit the speed-changed revolution force to a driven member, the plurality of gear-change stages being selectively switched over by the shift lever; a shift lever position detector for detecting a gear-change position of the shift lever; an accelerator sensor for sensing an operation amount of an accelerator pedal; a power transmitting clutch for establishing/interrupting power transmitted from the engine to the transmission; and a control unit for determining an abnormal throttle opening condition when the opening degree of the throttle valve sensed by the throttle opening sensor is not less than a predetermined value under the condition that the shift lever position is in a drive range and that the accelerator sensor senses a fully-released position of the accelerator pedal, the control unit being operable to control, upon determination of the abnormal throttle opening condition, the power transmitting clutch in such a manner as to place it into a power interrupting state.

According to another aspect of the present invention, there is provided a control apparatus for an automatic transmission comprising: a throttle actuator for opening/closing a throttle valve provided in an air intake pipe of an engine; a throttle opening sensor for sensing an opening degree of the throttle valve; a transmission for speed-changing a revolution force of the engine so as to transmit the speed-changed revolution force to a driven member; an accelerator sensor for sensing an operation amount of an accelerator pedal; a gear-change actuator unit for controlling the transmission to a desired gear-change ratio; and a control unit for determining an abnormal throttle opening condition when the opening degree of the throttle valve sensed by the throttle opening sensor is not less than a predetermined value under the condition that the accelerator sensor senses a fully-released position of the accelerator pedal, the control unit being operable to control, upon determination of the abnormal throttle opening condition, the transmission in such a manner as to place it into a neutral state.

In one preferred form of the invention, the control unit limits the power of the engine when it determines that the throttle opening condition is abnormal.

In another referred form of the invention, the control unit generates a warning when it determines that the throttle opening condition is abnormal.

In a further preferred form of the invention, when it is determined that the throttle opening condition is abnormal, the control unit limits, upon the accelerator pedal being stepped on, the power of the engine in accordance with an operation amount of the accelerator pedal, generates a warning and connects the power transmitting clutch.

In a still further preferred form of the invention, when it is determined that the throttle opening condition is abnormal, the control unit limits, upon the accelerator pedal being stepped on, the power of the engine in accordance with an operation amount of the accelerator pedal, generates a warning and controls the gear-change actuator unit so as to change the gear-change ratio of the transmission to a desired gear-change ratio.

BRIEF DESCRIPTION OF THE DRAWINGS

For a better understanding of the present invention, reference is made of a detailed description to be read in conjunction with the accompanying drawings, in which.

DESCRIPTION OF THE PREFERRED EMBODIMENTS

A variety of preferred embodiments of the present invention will be described in detail while referring now to the accompanying drawings.

Embodiment 1

Figure 1:
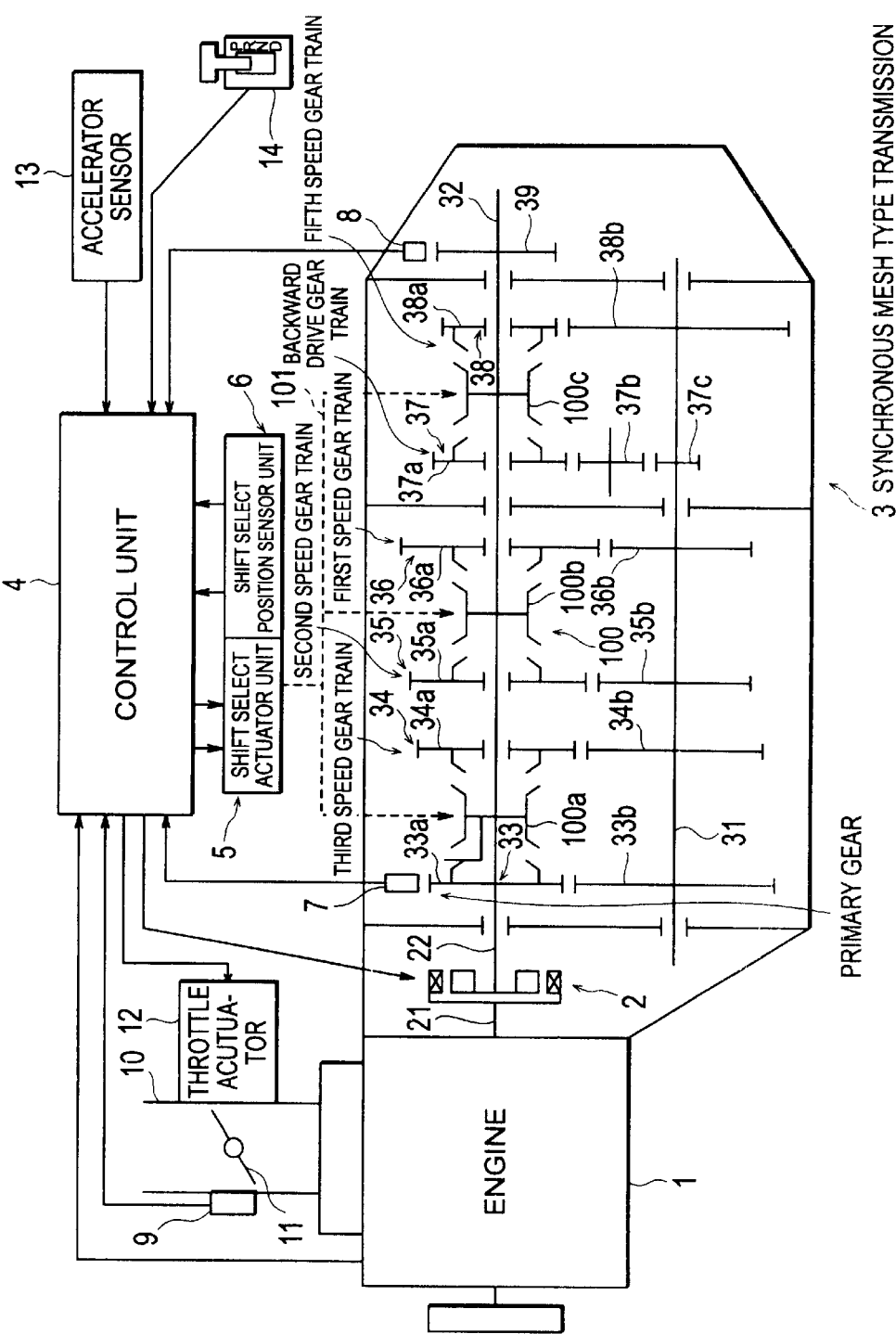
FIG. 1 is a schematic structural diagram for illustratively showing a control apparatus of a synchronous mesh type automatic transmission constructed in accordance with the present invention.

FIG. 1 illustratively shows the structure of a control apparatus for use with a synchronous mesh type automatic transmission according to a first embodiment of the present invention.

In FIG. 1, a reference numeral 1 indicates an engine such as an internal combustion engine for a vehicle, which is connected through an electromagnetic clutch 2 with a synchronous mesh type automatic transmission 3, which is controlled by a control unit 4.

A throttle valve 11 is provided in an air intake pipe 10 of the engine 1. An opening position of the throttle valve 11 is sensed by a throttle opening sensor 9, and an output signal of the sensor 9 is inputted to the control unit 4. The throttle opening sensor 9 is provided on the air intake pipe 10 in the vicinity of the throttle valve 11.

Also, a step-on or operational amount of an accelerator pedal (not shown) depressed by a vehicle operator or driver is sensed by an accelerator sensor 13. The accelerator sensor 13 generates an output signal to the control unit 4. The output signal of the sensor 13 is directly proportional to the step-on amount of the accelerator pedal. The control unit 4 processes the output signal of the accelerator sensor 13 so as to calculate a target throttle opening position in accordance with the step-on amount of the accelerator pedal. Then, based upon a deviation between the target throttle opening position and the detected throttle opening position detected by the throttle opening sensor 9, the control unit 4 feedback-controls the throttle valve 11 via a throttle actuator 12 in such a manner that the throttle opening position reaches the target throttle opening position.

The electromagnetic clutch 2 is interposed between a crank shaft 21 of the engine 1 and an input shaft 22 of the synchronous mesh type automatic transmission 3, and controls the transmission of engine power from the crank shaft 21 to the input shaft 22 of the synchronous mesh type automatic transmission 3. The electromagnetic clutch 2 is controlled by the control unit 4 so as to receive a clutch energizing current, thereby transmitting the rotation torque of the crank shaft 21 as a clutch transmitting torque controlled by the control unit 4 to the input shaft 22 of the synchronous mesh type automatic transmission 3. This clutch energizing current is directly proportional to the clutch transmitting torque.

The synchronous mesh type automatic transmission 3 corresponds to a counter shaft type 5-staged gear transmission, for example. This counter shaft type 5-staged gear transmission contains five sets of forward drive gear trains 33 to 36 and 38 respectively having different gear ratios; a pair of backward drive gear trains 37; and a shift gear 100 comprising a plurality of sleeve gears 100a to 111c (3 sleeve gears in this drawing) for switching over couplings between these gear trains and the output shaft 32. The input rotation force which is transmitted from the crank shaft 21 via the electromagnetic clutch 2 to the input shaft 22 is firstly transmitted via a primary gear train 33 to a counter shaft 31 arranged in parallel with the input shaft 22. The primary gear train 33 is located at a frontmost position (namely, leftmost position in FIG. 1) on the input shaft 22. The output shaft 32 is arranged in a coaxial relation with respect to the input shaft 22. The forward drive gear trains 33 to 36 and 38, driven gears 33a to 36a and 38a, and a driven gear 37a of the backward drive gear trains 37 are rotatably mounted on the output shaft 32. Drive gears 33b to 36b and 38b of the forward drive gear trains 33 to 36 and 38, and a drive gear 37b of the backward drive gear trains 37 are fixed onto the counter shaft 31 arranged in parallel with the output shaft 32. The first sleeve gear 100a is provided on the output shaft 32 in front of the third speed gear train 34 (i.e., between primary gear train 33 and third speed gear train 34) in such a manner that the first sleeve gear 100a is movable but not rotatable along the axial direction. The second sleeve gear 100b is provided between the second speed gear train 35 and the first speed gear train 36 in such a manner that the second sleeve gear 100b is movable but not rotatable along the axial direction on the output shaft 32. The third sleeve gear 10c is provided between the backward drive gear train 37 and the fifth speed gear train 38 in such a manner that the third sleeve gear 100c is movable but not rotatable along the axial direction on the output shaft 32. When the first sleeve gear 100a is moved along the output shaft 32 by a shift fork 101 (will be explained later) so as to be coupled with the driven gear 33a of the primary gear train 33, the first sleeve gear 10a serves to directly connect the input shaft 22 with the output shaft 32, thus functioning as a fourth speed gear. The power transmission path and gear-change ratio (i.e., the gear ratio of the primary gear X the gear ratio of each of the speed-change gears) is changed depending on which two of the gears 33a to 36a and 38a of the forward drive gear trains 33 to 36 and 38 and the gear 37a of the backward drive gear trains 37 are coupled or engaged with each other.

In the synchronous mesh type automatic transmission 3, the shift gear 100 is shift-controlled by a gear-change (shift select) actuator unit 5 controlled by signals output from the control unit 4, and the speed shift is performed by way of both a gear releasing operation and a gear coupling operation. The gear releasing operation releases mechanical mesh among the drive and driven gears of the present gear-change stage, and the gear coupling operation mechanically places the appropriate drive and driven gears of the succeeding gear-change stage into meshing engagement with each other.

The control unit 4 receives a shift lever position signal from the shift lever 14 indicative of the position thereof, an output signal of the accelerator sensor 13 indicative of the step-on amount of the accelerator pedal (not shown), and an output signal of a transmission output shaft rotation speed sensor 8 which senses the rotation speed of the output shaft 32 of the transmission. Based on these input signals, the control unit 4 determines a gear-change stage suitable for the vehicle driving condition by checking a transmission shift pattern (not shown) stored therein. While the shift select position of the shift lever 14 is detected by a shift select position sensor unit 6, the control unit 4 outputs a control signal to the shift select actuator unit 5 so as to shift-control the shift gear 100, so that the gear shift or speed change operation is carried out by way of both a releasing operation releasing mechanical mesh between the drive and driven gears of the present gear-change stage and a coupling operation mechanically meshing the drive and driven gears of the target gear-change stage with each other.

A synchronous state of the shift gear 100 is detected based upon a relationship between the rotation speed of the transmission input shaft sensed by a transmission input shaft rotation speed sensor 7 and the rotation speed of the transmission output shaft sensed by the transmission output shaft rotation speed sensor 8. When the shift gear is to be changed, the throttle valve 11 is choked to a predetermined opening position, and the energizing current for the electromagnetic clutch 2 is turned off so that the synchronous mesh type transmission is brought to a power off state. Thus, the shift gear-stage is switched over.

Figure 2:
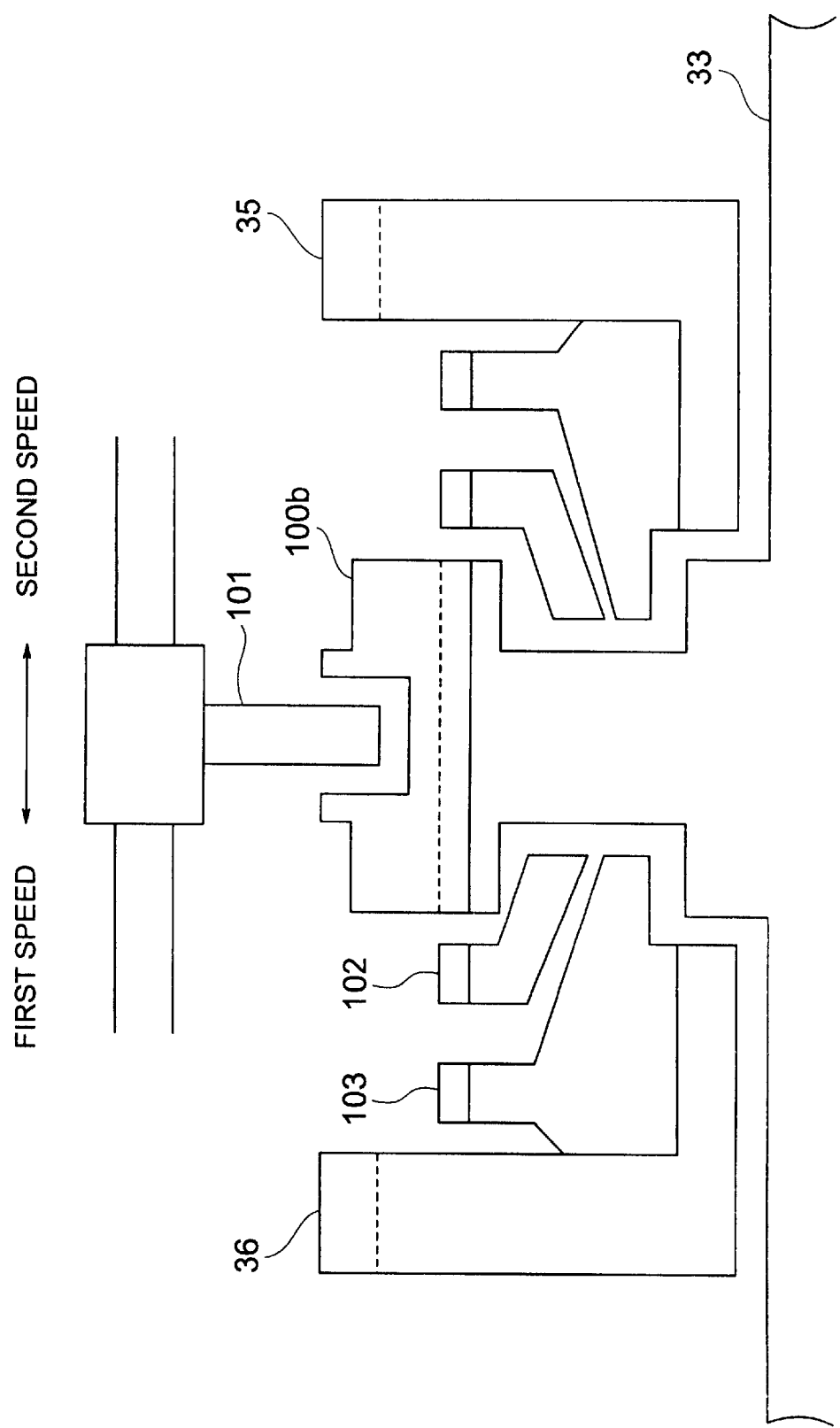
FIG. 2 is a schematic diagram of a first speed-to-second speed gear-changing synchronizer (synchro-mesh unit) according to a first embodiment of the present invention.

FIG. 2 is an operation diagram of the shift gear 100 upon gear changing between the first speed and the second speed in the synchronous mesh type automatic transmission according to the first embodiment of the present invention. Under the first speed stage, the second sleeve gear 100b of the shift gear 100 is meshed with both a synchronizer ring 102 and a synchronizer cone 103 provided on the side of the first speed gear train 36, and thus, engine power is transmitted from the first speed gear train 36 via the second sleeve gear 100b to the transmission output shaft 33. When a first-speed to second-speed gear change instruction is issued, the shift fork 101 is controlled to shift in a direction toward the second speed gear train 35 by the shift select actuator unit 5 under the control of the control unit 4, so that the mechanical meshing condition between the second sleeve gear 100b and the first speed gear train 36 is released. Subsequently, the second sleeve gear 100b urges the synchronizer ring 102 provided on the side of the second speed gear train 35 toward the second speed gear side, so that the synchronizer ring 102 is pressed against the synchronizer cone 103. As a result, the rotational synchronization between the transmission output shaft 33 and the second speed gear train 35 can be established, and thus, the mechanical meshing operation between the second sleeve gear 100b, the synchronizer ring 102 and the synchronizer cone 103 is carried out. This completes the first-speed to second-speed gear changing operation.

Figure 3:
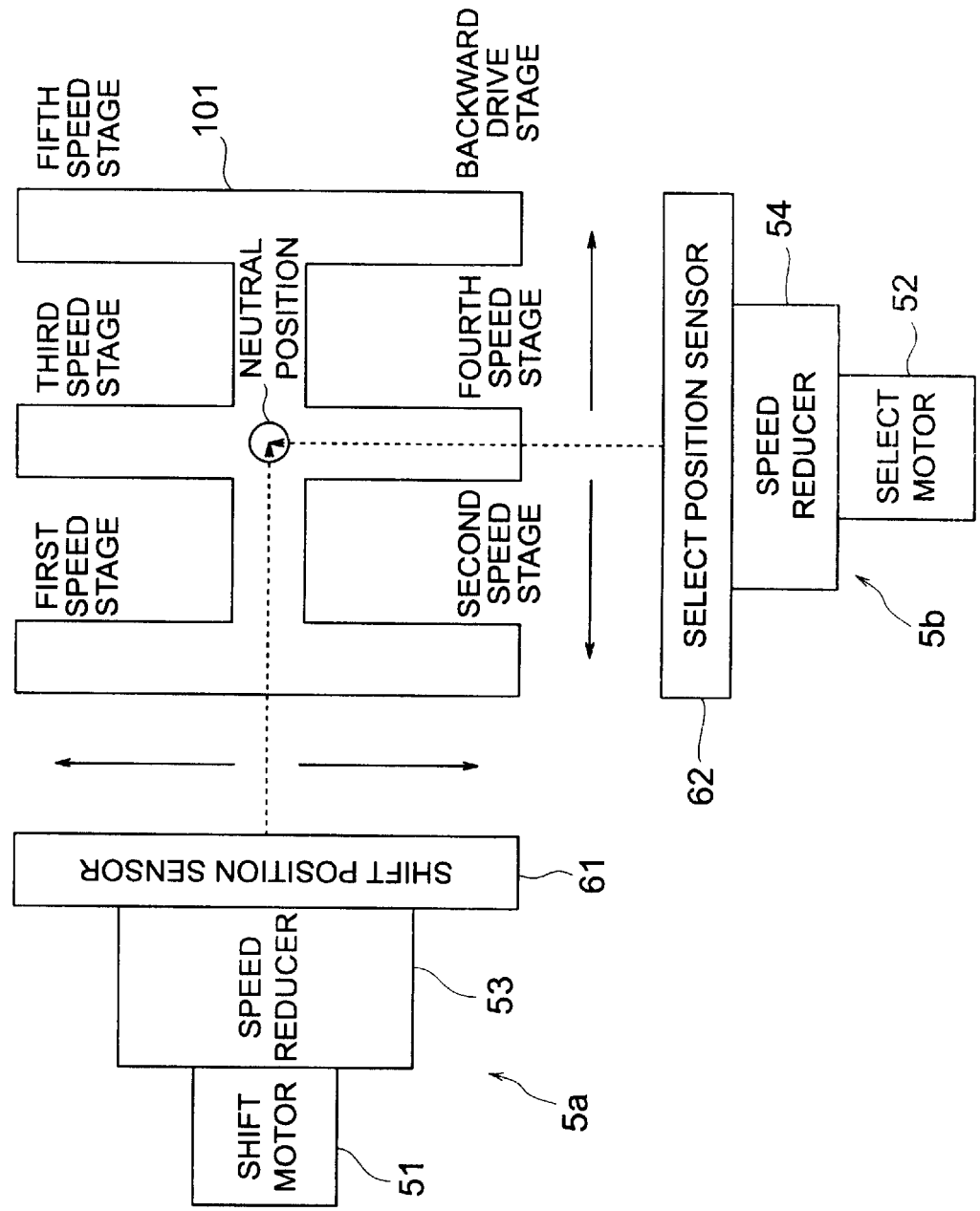
FIG. 3 is a diagram illustrating a relationship between a shift select actuator unit and a position sensor according to the first embodiment of the present invention.

FIG. 3 is a structural diagram of the shift select actuator unit 5 and the shift select position sensor unit 6 employed in the synchronous mesh type automatic transmission according to the first embodiment of the present invention.

As shown in FIG. 3, the shift select actuator unit 5 is composed of a shift actuator 5a for shift-driving the shift fork 101, and a select actuator 5b for select-driving the shift fork 101. The shift actuator 5a is equipped with a shift motor 51 and a speed reducer 53. The shift motor 51 moves the shift fork 101 along the axial direction of the output shaft 32. The speed reducer 53 serves to reduce the drive force of the shift motor 51 and transmit the thus reduced axial drive force to the shift fork 101. The select actuator 5b is equipped with a select motor 52 and a speed reducer 54. The select motor 52 moves the shift fork 101 in the rotating direction of the shift fork 101. The speed reducer 54 serves to reduce the drive force of the select motor 52 and transmit the thus reduced rotational drive force to the shift fork 101.

Also, the shift select position sensor unit 6 is provided with a shift position sensor 61 and a select position sensor 62. The shift position sensor 61 is disposed adjacent the speed reducer 53 of the shift actuator 5a, and senses a shift position of the shift fork 101. The select position sensor 62 is disposed adjacent the speed reducer 54 of the select actuator 5b, and senses a select position of the shift fork 101.

The shift control of the control unit 4 is carried out in the following manner. That is, the shift fork 101 is driven via the speed reducer 53 by the shift motor 51 built in the shift actuator 5a along the axial direction of the transmission output shaft 33, and the shift position of the shift fork 101 is sensed by the shift position sensor 61 to execute the feedback control of the shift position.

The select control of the control unit 4 is carried out in the following manner. That is, the shift fork 101 is driven via the speed reducer 54 by the select motor 52 built in the select actuator 5b to rotate in the rotation direction of the transmission output shaft 32 so as to be selectively engaged with one of the sleeve gears 100a to 100c of the shift gear 100, and the select position of the shift fork 101 is sensed by the select position sensor 62, so that the feedback control of the select position is carried out.

Figure 4:
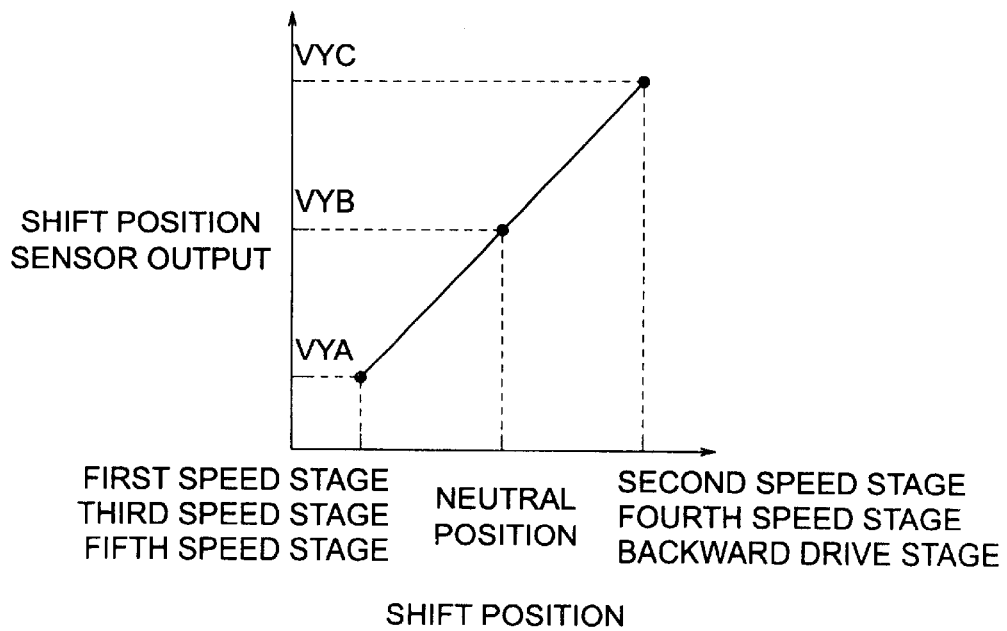
FIG. 4 is a characteristic diagram showing a relationship between a shift position of a shift actuator and an output of a shift position sensor according to the first embodiment of the present invention.

FIG. 4 shows a relationship between the above-explained shift position of the shift fork 101 and the output characteristic of the shift position sensor 61. Shift position voltage learned values at the first speed stage, the third speed stage and the fifth speed stage are indicated by "VYA"; a shift position voltage learned value at the neutral position is indicated by "VYB"; and shift position voltage learned values at the second speed stage, the fourth speed stage, and the backward drive stage are expressed by "VYC".

Figure 5:
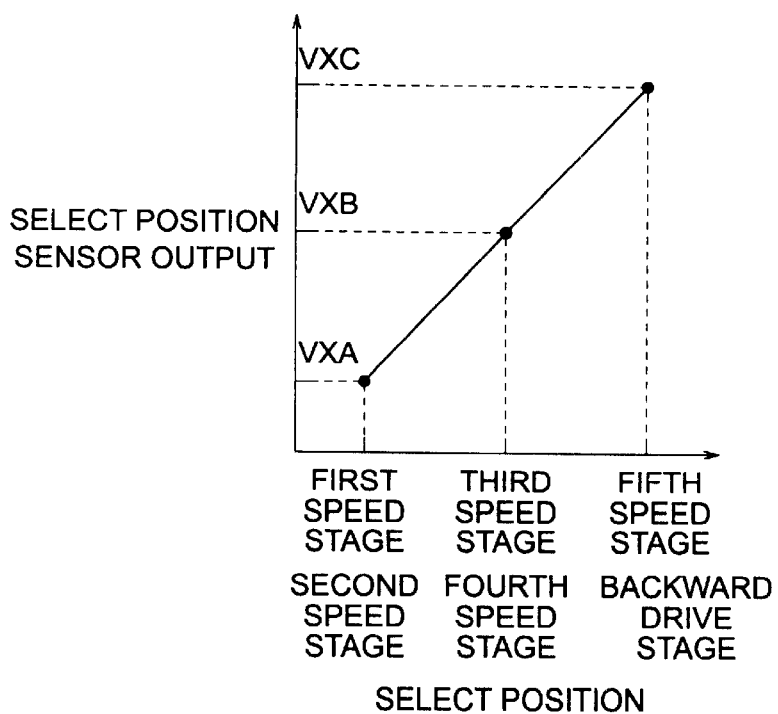
FIG. 5 is a characteristic diagram for showing a relationship between a select position of the select actuator and the output of the select position sensor according to the first embodiment of the present invention.

FIG. 5 shows a relationship between the above-explained select positions of the shift fork 101 and the output characteristic of the select position sensor 62.

Select position voltage learned values at the first speed stage and the second speed stage are indicated by "VXA"; select position voltage learned values at the third speed stage and the fourth speed stage (including the neutral position) are indicated by "VXB"; and a select position voltage learned value at the backward drive stage is indicated by "VXC."

Next, the operation of the first embodiment of the present invention will be explained.

Figure 6:
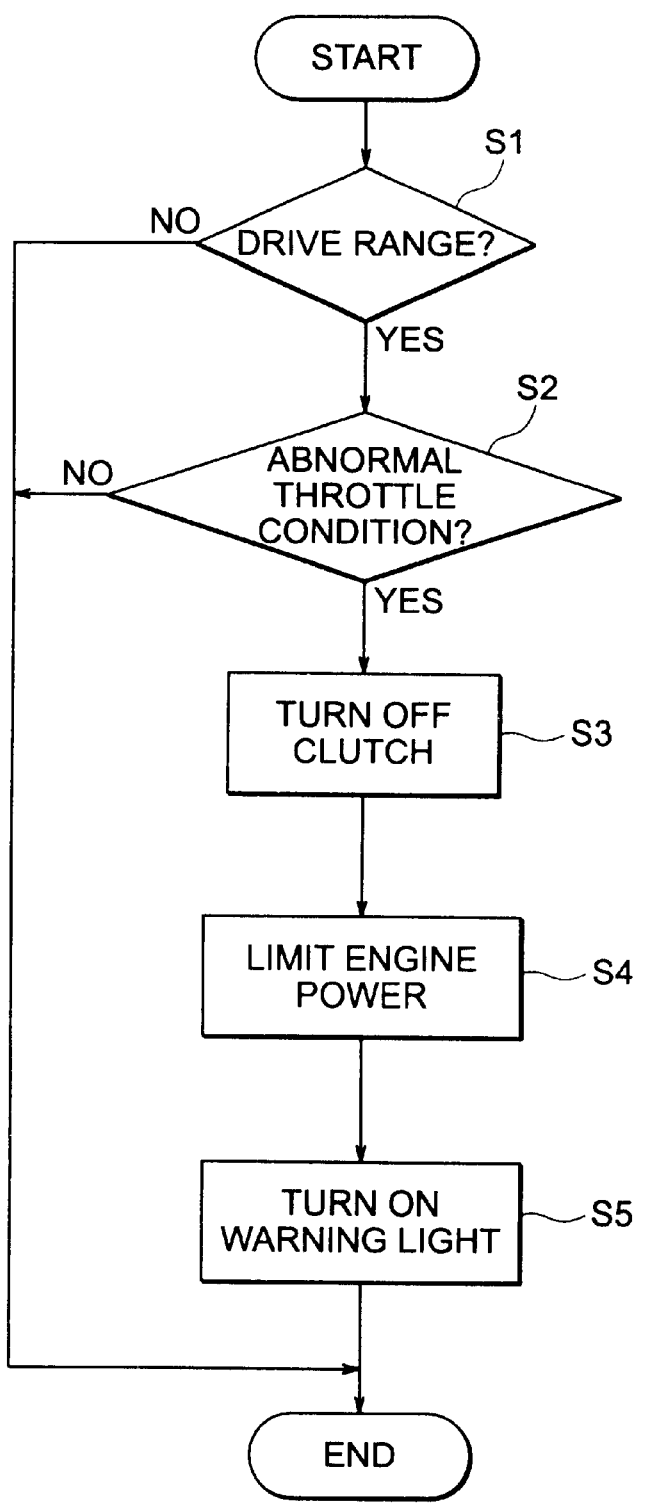
FIG. 6 is a flow chart illustrating a control process for determining an occurrence of an abnormal throttle opening condition in a drive range by the control apparatus for the automatic transmission according to the first embodiment of the present invention.

FIG. 6 is a flow chart illustrating processing for determining an abnormal throttle opening condition in the drive range.

In FIG. 6, a shift lever position signal indicative of a position of the shift lever 14 manipulated by the vehicle driver is input into the control unit 4. The control unit 4 determines as to whether or not the shift lever position is in the drive range (either the forward drive position D or the backward drive position R)(step S1). When the shift lever position is not in the drive range, the processing ends.

In the case where the shift lever position is in the drive range, when the accelerator pedal fully-released condition is detected from the output signal of the accelerator sensor 13, the throttle opening control condition by the throttle actuator 12 is monitored from the output signal of the throttle opening sensor 9. The control unit 4 determines that the abnormal throttle opening condition happens to occur, when the following condition is continued for a predetermined time period (for example, 1.0 second) in step S2. That is, a throttle opening voltage indicated by the output signal of the throttle opening sensor 9 is higher than or equal to a predetermined throttle opening voltage (for instance, a mapped value set by the water temperature of the engine concerned). Then, the electromagnetic clutch 2 is turned off (step S3) so as to interrupt the power transmission from the engine 1 to the synchronous mesh type automatic transmission 2, and also execute an engine power limiting operation (step S4). In this engine power limiting operation, for instance, fuel is cut in order that the engine revolution speed is made slower than a predetermined revolution speed. Then, a warning lamp (not shown) is turned on to warn the vehicle driver of the fact that the abnormal throttle opening condition has occurred (step S5). Such a condition is maintained so as to prevent the throttle valve from returning to the abnormal opening condition.

Moreover, when it is determined in step S2 that there is no abnormal throttle opening condition, the processing is ended.

Embodiment 2

Figure 7:
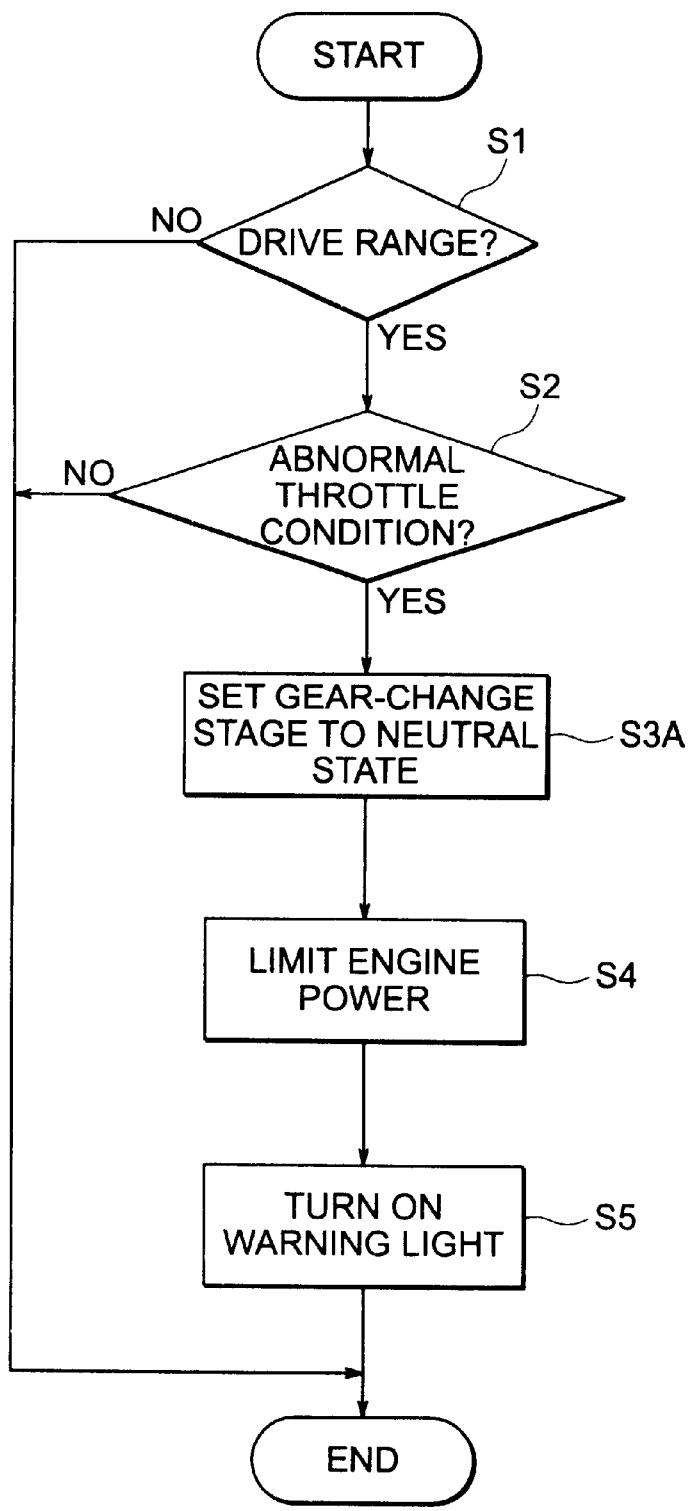
FIG. 7 is a flow chart for explaining a control process for determining an occurrence of an abnormal throttle opening condition in a drive range by the control apparatus for the automatic transmission according to a second embodiment of the present invention.

FIG. 7 is a flow chart illustrating processing for determining an abnormal throttle opening condition in the drive range according to a second embodiment of the present invention.

The second embodiment corresponds to such a case that a hydraulic automatic transmission is employed as an automatic transmission. In this case, power is transferred between an engine and the hydraulic automatic transmission through a torque converter.

A basic control operation of the second embodiment as to the processing for determining an abnormal throttle opening condition in the drive range is substantially the same as that of the first embodiment. However, in the second embodiment, in step S3A of FIG. 7, a gear-change stage selection by a gear-change actuator unit (for example, selection of a gear-change stage by means of a combination of operations of electromagnetically operated hydraulic valves) is brought into the neutral condition to interrupt the power transmission from the engine to the drive wheels of a vehicle which function as driven members. As a result, the safety vehicle driving can be secured even if an abnormal throttle opening control operation is carried out. It should be noted that other control steps S1, S2, S4, and S5 of the second embodiment are similar to those of the above-explained first embodiment.

Although the above description given in the second embodiment is of the case where the automatic transmission is the hydraulic automatic transmission, the same results can also be obtained in the the case of a synchronous mesh type automatic transmission, as explained in the first embodiment, when a malfunction is caused such that the power transmitting clutch 2 cannot interrupt the power transmission for some reasons, by controlling the shift select position so as to reach the neutral position through the action of the gear-change (shift select) actuator unit 5, to thereby bring the gear meshing condition of the synchronous mesh type automatic transmission 3 into the neutral condition.

Embodiment 3

Figure 8:
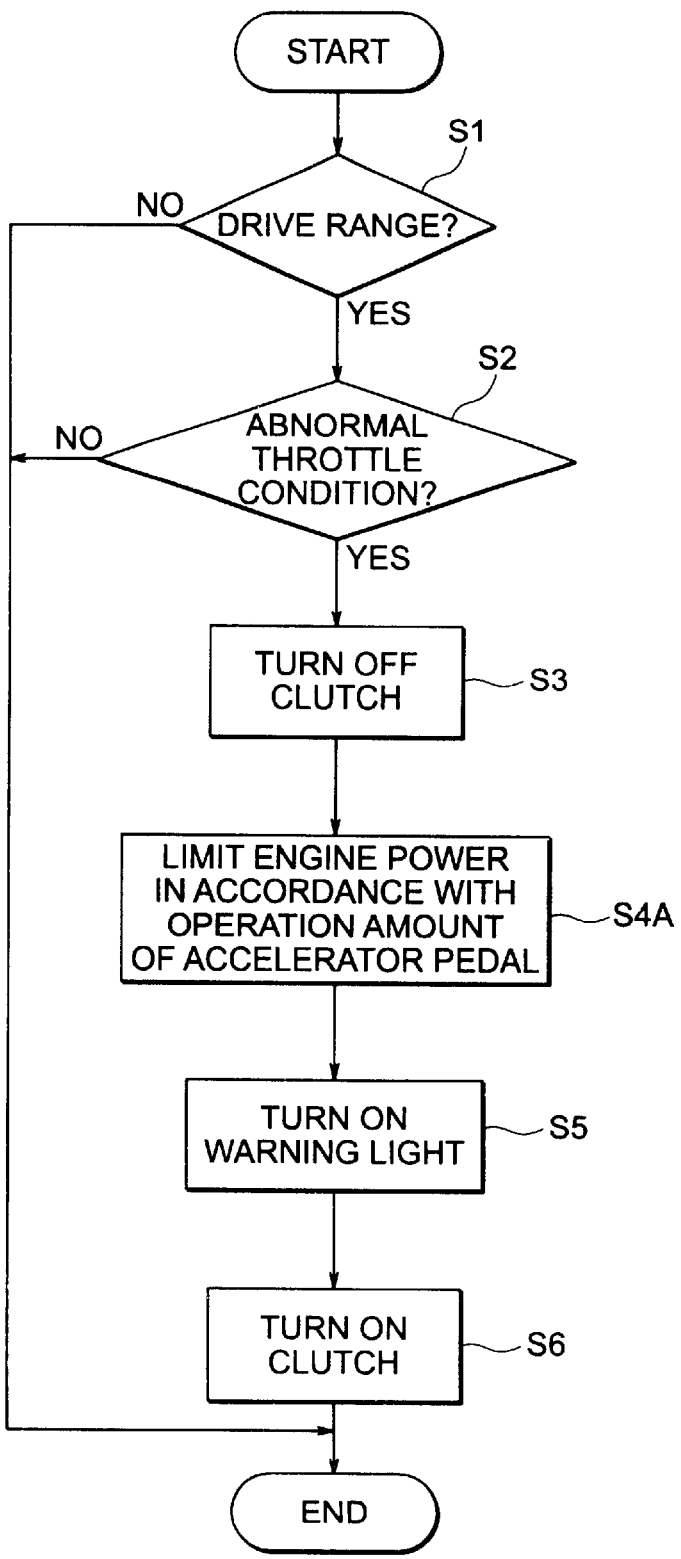
FIG. 8 is a flow chart illustrating a control process for determining an occurrence of an abnormal throttle opening condition in a drive range by the control apparatus for the automatic transmission according to a third embodiment of the present invention.

FIG. 8 is a flow chart illustrating processing for determining an abnormal throttle opening condition in the drive range, executed by a control apparatus of an automatic transmission according to a third embodiment of the present invention.

In the third embodiment, when the control unit 4 determines that an abnormal throttle opening condition occurs, as in the above-explained first embodiment ("YES" in step S2), the control unit 4 turns off or releases the power transmitting clutch (step S3). When the accelerator pedal is stepped on in the drive range of the automatic transmission, the control unit 4 executes an engine power limitation in accordance with the step-on amount of the accelerator pedal. For instance, when the accelerator pedal is not depressed at all or is fully released, the vehicle is driven to run using only some of the cylinders, whereas when the accelerator pedal is fully depressed, the vehicle is driven to run with all the cylinders being actively operated (step S4A). Then, the control unit 4 turns on a warning light (step S5), and also connects the power transmitting clutch (step S6) in order that the vehicle can be driven in the slow speed drive mode.

Embodiment 4

Figure 9:
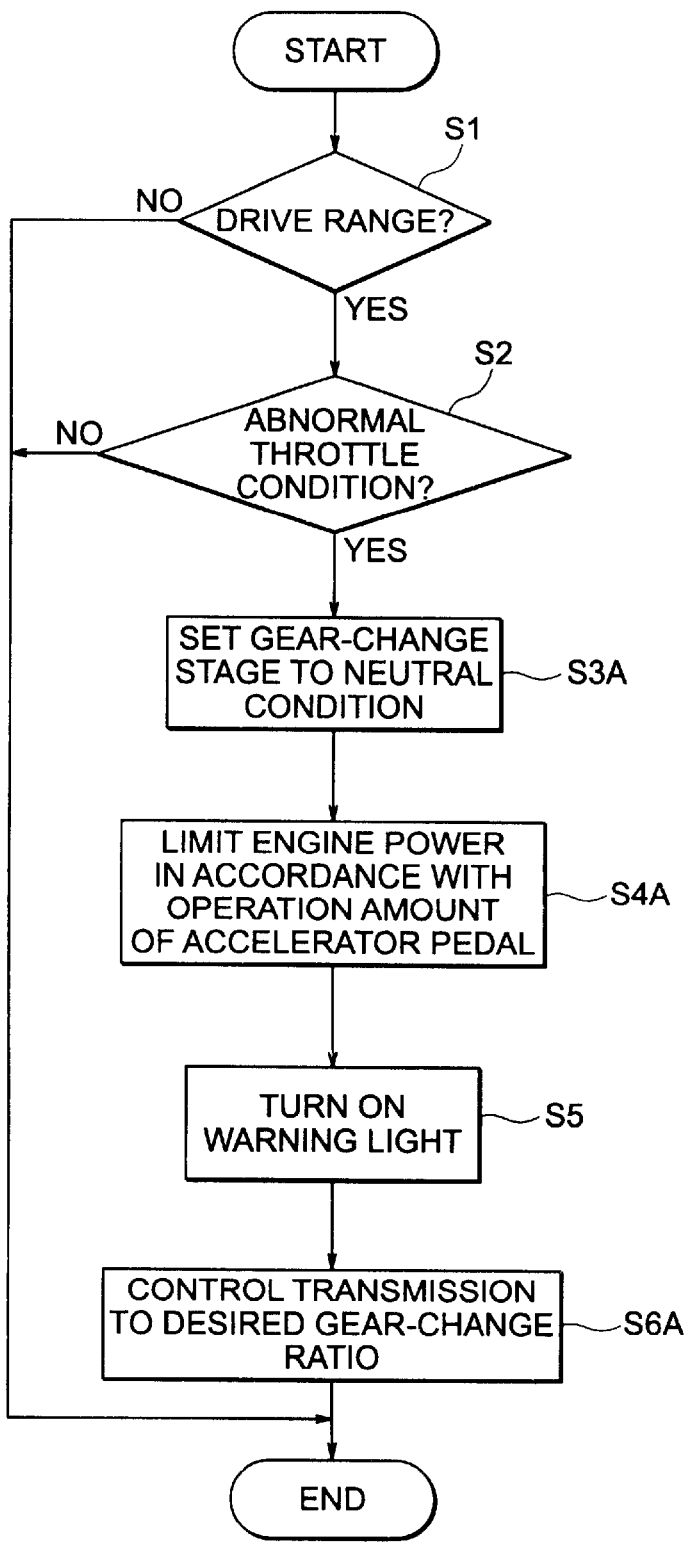
FIG. 9 is a flow chart illustrating a control process for determining an occurrence of an abnormal throttle opening condition in a drive range by the control apparatus for the automatic transmission according to a fourth embodiment of the present invention.

FIG. 9 is a flow chart illustrating processing for determining an abnormal throttle opening condition in the drive range, executed by a control apparatus of an automatic transmission according to a fourth embodiment of the present invention.

In the fourth embodiment, when it is determined that an abnormal throttle opening condition occurs as in the above-explained second embodiment ("YES" at step S2), the control unit 4 sets the gear-change stage to the neutral condition (step S3A). When the accelerator pedal is stepped on in the drive range of the automatic transmission, the control unit 4 executes the engine power limitation in accordance with the step-on amount of the accelerator pedal (step S4A).

Then, the control unit 4 generates a warning through the warning light (step S5), and furthermore, the gear-change actuator unit 5 controls the automatic transmission to a desired gear-change ratio (step S6A) in order that the vehicle can be driven in the slow speed drive mode.

As previously described in detail, a control apparatus for an automatic transmission according to one aspect of the present invention comprises: a throttle actuator for opening/closing a throttle valve provided in an air intake pipe of an engine; a throttle opening sensor for sensing an opening degree of the throttle valve; a transmission having a shift lever and a plurality of gear-change stages for speed-changing a revolution force of the engine so as to transmit the speed-changed revolution force to a driven member, the plurality of gear-change stages being selectively switched over by the shift lever; a shift lever position detector for detecting a gear-change position of the shift lever; an accelerator sensor for sensing an operation amount of an accelerator pedal; a power transmitting clutch for establishing/interrupting power transmitted from the engine to the transmission; and a control unit for determining an abnormal throttle opening condition when the opening degree of the throttle valve sensed by the throttle opening sensor is not less than a predetermined value under the condition that the shift lever position is in a drive range and that the accelerator sensor senses a fully-released position of the accelerator pedal, the control unit being operable to control, upon determination of the abnormal throttle opening condition, the power transmitting clutch in such a manner as to place it into a power interrupting state.

With this arrangement, the control unit monitors the abnormal condition of the throttle actuator by virtue of a throttle opening control condition with the accelerator pedal being released to return the throttle valve to its fully-closed position. Upon determination of an abnormal throttle opening condition, the control unit brings the power transmitting clutch into a power interrupting condition, so that the possibility of vehicle driving not intended by a vehicle driver can be avoided, thus ensuring safety driving.

According to another aspect of the present invention, there is provided a control apparatus for an automatic transmission comprising: a throttle actuator for opening/closing a throttle valve provided in an air intake pipe of an engine; a throttle opening sensor for sensing an opening degree of the throttle valve; a transmission for speed-changing a revolution force of the engine so as to transmit the speed-changed revolution force to a driven member; an accelerator sensor for sensing an operation amount of an accelerator pedal; a gear-change actuator unit for controlling the transmission to a desired gear-change ratio; and a control unit for determining an abnormal throttle opening condition when the opening degree of the throttle valve sensed by the throttle opening sensor is not less than a predetermined value under the condition that the accelerator sensor senses a fully-released position of the accelerator pedal, the control unit being operable to control, upon determination of the abnormal throttle opening condition, the transmitting in such a manner as to place it into a neutral state.

With this arrangement, the control unit monitors the abnormal condition of the throttle actuator by virtue of a throttle opening control condition with the accelerator pedal being released to return the throttle valve to its fully-closed position. Upon determination of an abnormal throttle opening condition, the control unit brings the transmission into a neutral state, so that the possibility of vehicle driving not intended by a vehicle driver can be avoided, thus ensuring safety driving.

In one preferred form of the invention, when it is determined that the throttle opening condition is abnormal, the control unit limits the power of the engine, so that the power of the engine is securely limited, thus ensuring safety driving of the vehicle.

In another preferred form of the invention, when it is determined that the throttle opening condition is abnormal, the control unit generates a warning, so that the driver can recognize the abnormality of the apparatus, thereby avoiding unnecessary confusion.

In a further preferred form of the invention, when it is determined that the throttle opening condition is abnormal, the control unit limits, upon the accelerator pedal being stepped on, the power of the engine in accordance with an operation amount of the accelerator pedal, generates a warning and connects the power transmitting clutch. With this arrangement, when the operation of the throttle valve is abnormal, the vehicle can be driven to run in a slow speed drive mode while limiting the engine power in accordance with the operation amount of the accelerator pedal, to thereby ensure safety driving.

In a still further preferred form of the invention, when it is determined that the throttle opening condition is abnormal, the control unit limits, upon the accelerator pedal being stepped on, the power of the engine in accordance with an operation amount of the accelerator pedal, generates a warning and controls the gear-change actuator unit so as to change the gear-change ratio of the transmission to a desired gear-change ratio. Thus, when the operation of the throttle valve is abnormal, the vehicle can be driven to run in the slow speed drive mode while limiting the engine power in accordance with the operation amount of the accelerator pedal, to thereby ensure safety driving.

What is claimed is:

1. A control apparatus for an automatic transmission comprising:

a throttle actuator for opening/closing a throttle valve provided in an air intake pipe of an engine;

a throttle opening sensor for sensing an opening degree of said throttle valve;

a transmission having a shift lever and a plurality of gear-change stages for speed-changing a revolution force of said engine so as to transmit the speed-changed revolution force to a driven member, said plurality of gear-change stages being selectively switched over by said shift lever;

a shift lever position detector for detecting a gear-change position of said shift lever;

an accelerator sensor for sensing an operation amount of an accelerator pedal;

a power transmitting clutch for establishing/interrupting power transmitted from said engine to said transmission; and a control unit for determining an abnormal throttle opening condition when the opening degree of said throttle valve sensed by said throttle opening sensor is not less than a predetermined value under the condition that said shift lever position is in a drive range and that said accelerator sensor senses a fully-released position of said accelerator pedal, said control unit being operable to control, upon determination of the abnormal throttle opening condition, said power transmitting clutch in such a manner as to place it into a power interrupting state.

2. The control apparatus for an automatic transmission as claimed in claim 1, wherein said control unit limits the power of said engine when it determines that the throttle opening condition is abnormal.

3. The control apparatus for an automatic transmission according to claim 1, wherein said control unit generates a warning when it determines that the throttle opening condition is abnormal.

4. The control apparatus for an automatic transmission according to claim 1, wherein when the throttle opening condition is determined to be abnormal, said control unit limits, upon said accelerator pedal being stepped on, the power of said engine in accordance with an operation amount of said accelerator pedal, generates a warning and connects said power transmitting clutch.

* * * * *